Nov. 21, 1972 NAKAMURA SHIGEAKI ET AL 3,703,594

METHOD FOR MANUFACTURING A PHOTOCONDUCTIVE POWDER

Filed Nov. 9, 1971 2 Sheets-Sheet 1

Nov. 21, 1972 NAKAMURA SHIGEAKI ET AL 3,703,594

METHOD FOR MANUFACTURING A PHOTOCONDUCTIVE POWDER

Filed Nov. 9, 1971 2 Sheets-Sheet 2

United States Patent Office 3,703,594
Patented Nov. 21, 1972

3,703,594

METHOD FOR MANUFACTURING A PHOTOCONDUCTIVE POWDER

Shigeaki Nakamura and Tadao Nakamura, Kawasaki-shi, and Tadao Kohashi, Yokohama, Japan, assignors to Matsushita Electric Industrial Co., Ltd., Osaka, Japan Continuation-in-part of abandoned application Ser. No. 715,045, Mar. 21, 1968. This application Nov. 9, 1971, Ser. No. 197,070
Claims priority, application Japan, Mar. 31, 1967, 42/20,846; Apr. 7, 1967, 42/22,545
Int. Cl. H01c 7/08
U.S. Cl. 252—501 6 Claims

ABSTRACT OF THE DISCLOSURE

A photoconductor of the kind consisting essentially of CdSe or CdS-Se, and containing copper as an activator and a halogen as a coactivator. In the photoconductor, zinc is added as a further additive in order to improve its sensitivity to a low intensity optical input and to increase its dark resistance so that the photoconductor can be employed for the manufacture of various photoelectric devices having an improved and stable operating characteristic.

CROSS REFERENCE TO THE RELATED APPLICATION

This application is a continuation-in-part application of U.S. Ser. No. 715,045 filed on Mar. 21, 1968, and now abandoned.

BACKGROUND OF THE INVENTION

This invention relates to a method for manufacturing a photoconductive powder, and more particularly to a method for manufacturing a photoconductive powder of the kind consisting essentially of cadmium selenide or cadmium sulfoselenide and showing high sensitivity to a low intensity optical input and an improved dark resistance. The cadmium selenide and cadmium sulfoselenide will hereinafter be collectively referred to as $CdS_{1-x}Se$ $(O<x\leqq 1)$ for the sake of simplicity, wherein $x$ is the composition ratio and $x=1$ corresponds to CdSe.

Powdery photoconductors represented by the formula $CdS_{1-x}Se_x$ $(O<x\leqq 1)$ and containing impurities therein are sensitive also to a wavelength longer than their photoconductively sensitive wavelengths corresponding to the width of their forbidden band and can thus be utilized to make various photoelectric devices, photoelectric relays and the like for operation in response to near infrared rays. Among these CdSe, CdS-Se and like photoconductors, those having a high infrared senstivity, that is, showing a high rate of photo-current variation in response to an infrared ray input of quite low intensity can be advantageously used to make the devices of the kind described above, because these devices can successfully operate with an associated infrared ray source of sufficiently low intensity and thus great advantage can be obtained in respect of simplification of the structure of the devices and reduction in the manufacturing costs.

SUMMARY OF THE INVENTION

It is a primary object of the present invention to provide a method for manufacturing a novel and improved photoconductive powder which has high sensitivity and an improved dark resistance by virtue of the fact that zinc is added to a conventional photoconductor of the above kind which contains therein a I*b*-group element such as copper as an activator and a VII*b*-group element as a coactivator.

The above and other objects, advantages and features of the present invention will be apparent from the following description with reference to the accompanying drawings.

DESCRIPTION OF THE PREFERRED EMBODIMENTS

Figure 1:
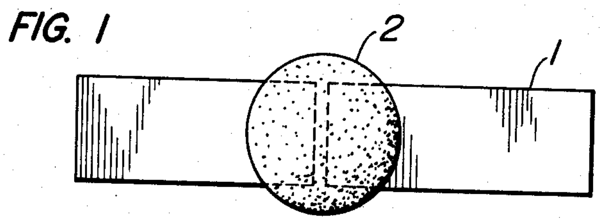
FIG. 1 is a sectional view showing the structure of a test specimen used for the measurement of the operating characteristics of the powdery photoconductor embodying the present invention.

Powery photoconductive CdSe and CdS-Se heretofore known in the art contain copper as an activator and at least one of chlorine, bromine and iodine as a coactivator. These conventional photoconductors are featured by the fact that while the relation $I_p \propto L^{\alpha}$ normally holds between an input ray intensity L and their photo-current $I_p$, $\alpha$ becomes larger than unity in a range of low optical input intensity. This fact is intimately related to their mechanism of photoconductivity intensification, but it is desirable from the standpoint of photosensitivity that $\alpha$ has a value in the order of unity in order that these photoconductors may practically successfully be operated in a range of low optical input intensity. Furthermore, the conventional powdery photoconductors described above are also featured by the fact that, while the relation $I_D \propto V^{\beta}$ holds between dark voltage V and dark current $I_D$, $\beta$ is generally quite larger than unity. This tendency is especially conspicuous in the photoconductive CdSe or CdS-Se containing therein copper as an activator and at least one of bromine and iodine as a coactivator. In this case too, it is desirable that $\beta$ has a value which is very close to unity.

The above requirements are essential to, for example, a solid-state image conversion device which comprises a layer of an electrically luminescent material and a layer of a photoconductive material stacked in tiers, at least two electrodes disposed on opposite sides of the stack, and at least one power source for power supply to these electrodes, and which is based on the principle that a variation in the impedance of the photoconductive layer due to the projection of an image in the form of a radiation input is utilized to luminously display the image on the electrically luminescent layer. In order to lower the minimum detectable input of such a solid-state image conversion device, in other words, to obtain sensitivity for lower input, it is especially necessary that the photoconductive layer has high sensitivity to a low optical input. By the use of such a photoconductor, a more successful image conversion of radiant energy coming from a body emitting a weaker radiation becomes feasible. At the same time, in order that an image output from such a solid-state image conversion device has good contrast and in view of the requirement that the lowest possible dark luminescence is preferred, the value of $\beta$ in the dark voltage-dark current characteristic of the photoconductor must be very close to unity as pointed out in the above.

From the above standpoint, the inventors have made experiments to meet the above demands and he has found that addition of zinc besides the above-specified impurities to the photoconductive CdSe and CdS-Se gives a satisfactory result. The photoconductor according to the present invention consists essentially of $CdS_{1-x}Se_x$ ($0<x\leqq 1$) to which copper, at least one of the elements selected from the group consisting of chlorine, bromine and iodine, and a further additive, zinc, are added in very small amounts. By the addition of these impurities, it is possible to improve the sensitivity to a low intensity optical input as well as the dark resistance of the photoconductor whose host material is $CdS_{1-x}Se_x$ ($0<x\leqq 1$), that is, CdSe or CdS-Se.

Preferred embodiments of a method for manufacturing the powdery photoconductor according to the present invention will be described in more concrete terms.

EXAMPLE 1

CdSe in an amount of 100 grams is dispersed in 200 cc. of distilled water. A 0.1-mol solution of copper nitrate in an amount of 2.5 cc. (hence, containing about $5\times 10^{-4}$ mols of copper per mol) is added to the dispersion, and the mixture is dried for 17 hours at a temperature of 150° C. The mixture so dried is then ground into small particles, which are subsequently sintered for 40 minutes at a temperature of 600° C. in an atmosphere containing oxygen therein. In the course of the above process, the host material is sintered to give a relatively hard sintered composition.

The sintered composition is cooled down, and then pulverized into powder by means of a mortar or the like.

After thorough washing with water, the sintered composition in the form of the powder is wetted with a solution containing at least one of 0.2 mol of cadmium bromide and ammonium bromide in 1,000 cc. and with a solution containing 0.5 mol of zinc nitrate in 1,000 cc. for the addition of bromine as a coactivator and zinc as an impurity additive. The composition is then filtered, and dried to evaporate the mixture of the water of said solution containing coactivator and the water of said zinc salt solution from the host material and allow to zinc to diffuse into the host material and sieved.

Subsequently, it is baked for 40 minutes at a temperature of 600° C. in an atmosphere containing therein oxygen.

After thoroughly cooling, the baked composition is sieved and sulfur in an amount of 1 gram is added thereto. The composition having sulfur added thereto is baked for 15 minutes at a temperature of 480° C. in an atmosphere of an inert gas such as nitrogen or argon, and is further baked for 10 minutes in a vacuum atmosphere. The baked composition is thoroughly cooled and is then sieved to obtain the final product. The final product thus obtained is a photoconductor in the form of CdSe which has high photoconductive sensitivity and has especially high sensitivity to a low intensity optical input.

Copper which is added in the first step of the above method may preferably be in the form of copper nitrate as described above, but any other suitable salt of copper may be selected in lieu of the copper nitrate. A satisfactory result can also be obtained by use of copper chloride, copper bromide, copper sulfate, or the like. Copper may desirably be added in an amount of $2\times 10^{-4}$ to $10^{-3}$ molecules per molecule of the host material which in this case is CdSe, and may be replaced by a Ib-group element such as silver.

The temperature of the first baking treatment is not necessarily limited to 600° C., but a baking temperature in the order of 500° C. to 700° C. is preferred because, at a temperature lower than the above-specified temperature, the activator cannot sufficiently diffuse into the host material, while at a temperature higher than the above-specified temperature, the host material is sintered to an undesirably great degree such that pulverization is difficult to attain. In this baking step, the activator is introduced into the host material, but the powdery host material does not yet possess a sufficient photoconductive sensitivity. Zinc which is added prior to the second baking treatment is not in any way limited to the form of zinc nitrate, and any other suitable zinc compound such as, for example, zinc halide or zinc sulfate may be added to attain the desired effect of addition of zinc to the final product. Furthermore, the amount of the zinc compound to be added is not in any way limited to the amount specified in the embodiment.

The second baking treatment achieves the desired crystal growth of the host material, the introduction of the coactivator into the host material, and the introduction of zinc into the host material in order to improve the sensitivity of the photoconductor.

In the third baking treatment, an excess portion of the coactivator and selenium vacancies produced due to vaporization of selenium during the preceding baking treatment may be replaced and filled by sulfur, and the contact between the powder particles is changed, which lends itself to the desired increase in dark resistance.

EXAMPLE 2

In this example, the bromine employed as the coactivator in the preceding example is partly or wholly replaced by iodine. More precisely, the bromine supplier cadmium bromide employed in Example 1 is partly or wholly replaced by cadmium iodide, or where ammonium bromide is used, it is replaced by ammonium iodide, and steps entirely similar to those taken in Example 1 are employed to obtain a photoconductor in the form of CdSe which has especially high sensitivity to a low intensity optical input and an improved dark resistance.

Needless to say, an improvement similar to the above can be effected by partly or wholly replacing as required the auxiliary activator supplier, which is the halide of bromine, cadmium bromide or ammonium bromide, by a chloride, cadmium chloride or ammonium chloride, as in the case of iodine. It is to be understood that the employment of such a coactivator supplier is included in the scope of the present invention. The partial or whole replacement of these halides also applies to Example 3 which will now be described.

EXAMPLE 3

In lieu of CdSe employed in Examples 1 and 2, a mixture or solid solution of CdS and CdSe in an amount of 100 grams is employed, and steps entirely similar to those taken in Examples 1 and 2 are employed to obtain a photoconductor in the form of $CdS_{1-x}Se_x$ $$(0<x<1)$$

which has especially high sensitivity to a low intensity optical input and an improved dark resistance.

The improvements effected by the present invention in the sensitivity to a low intensity optical input and in the dark resistance of the photoconductive $CdS_{1-x}Se_x$, where $0<x\leqq 1$, will now be described with reference to the drawings. The test specimen used in the measurement of the operating characteristics of the photoconductor comprises an electrode 1 having a size of 7 mm. by 0.7 mm. and a layer 2 of the photoconductor cemented on the electrode by an ethyl cellulose binder as shown in FIG. 1.

Figure 2:
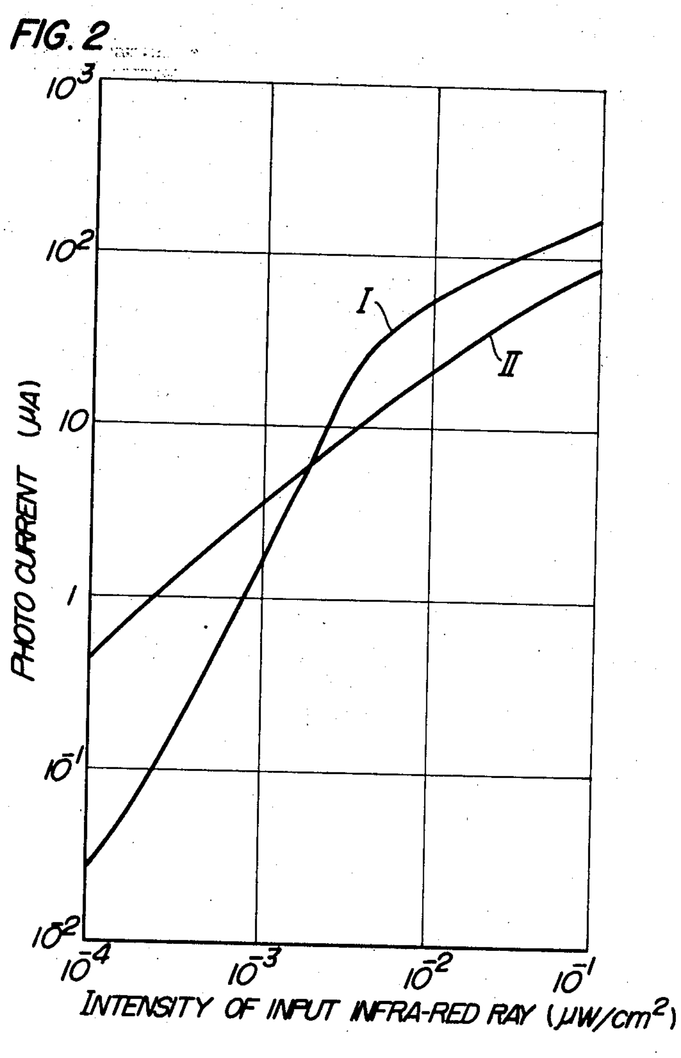
FIG. 2 is a graphic illustration of the photo-current relative to the intensity of input infrared rays in the powdery photoconductor according to the present invention compared with the similar relation in a conventional photoconductor of this kind.

In FIG. 2, the curve I represents the relation between the intensity of input infrared ray and the photocurrent in conventional photoconductive CdSe, while the curve II represents a similar characteristic of the photo-CdSe containing an additional additive of zinc in accordance with the present invention. The vertical axis shows the value of photoelectric current $I_p$ in microamperes when a D.C. voltage of 400 volts is applied to the test specimen, and the horizontal axis shows the value of input infrared ray intensity $LI_R$ in microwatts per square centimeter. The infrared ray used in the test is obtained by causing the radiant rays from an incandescent lamp to pass through an interference filter which has a maximum transmissive wavelength of 0.96 micron. From FIG. 2, the dependence of the photo-current $I_p$ on the input infrared ray intensity $L_{IR}$ in both the photoconductors may be expressed as $I_p \propto I_{IR}^{\alpha}$. Then, the value of $\alpha$ in the the curve I is about 2 at low optical input intensity and conventional photoconductive material represented by about 0.5 at high optical input intensity, whereas the value of $\alpha$ in the photoconductive material of the present invention represented by the curve II is about 1 at a low optical input intensity and about 0.5 at a high optical input intensity. In this connection, it is commonly known that, even in case of a conventional photoconductive material in the form of $CdS_{1-x}Se_x$ $(O<x<1)$, the value of $\alpha$ in a region of low optical input intensity is always larger than unity. However, in the case of the same type photoconductive material according to the present invention, the value of $\alpha$ in a region of low optical input intensity is approximately equal to unity. Accordingly, as will be readily seen from FIG. 2, the photoconductive material according to the present invention delivers a remarkably larger photoelectric current than that of the conventional photoconductive material in a region below a certain input level.

Figure 3:
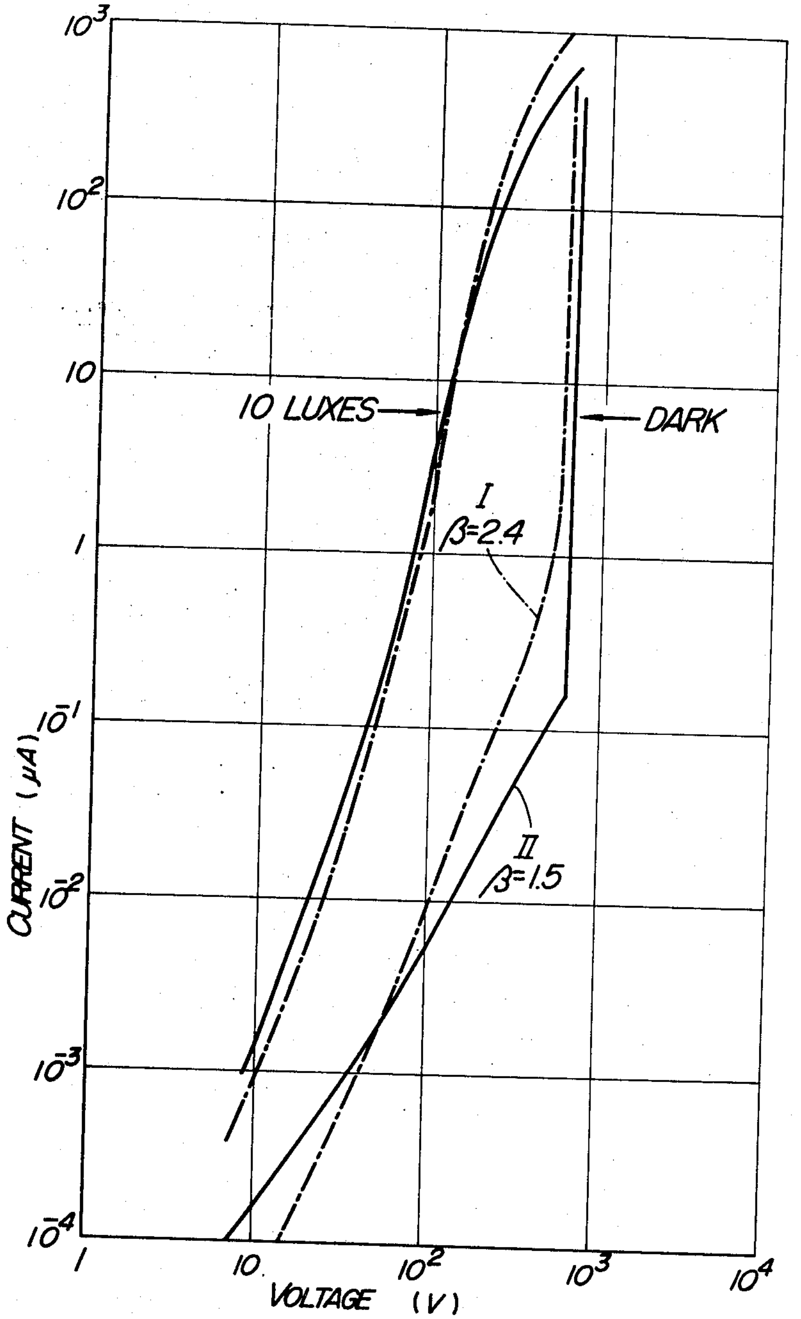
FIG. 3 is a graphic illustration of the voltage-current characteristic in a dark condition and in an illuminated condition of the powdery photoconductor according to the present invention compared with the similar characteristic of a conventional photoconductor of this kind.

In FIG. 3, the curves I represent the voltage-current characteristic in the dark and in the illuminated state of conventional photoconductive CdSe, while the curves II represent a similar characteristic of the photoconductive CdSe containing an additional additive of zinc in accordance with the present invention. The vertical axis shows the value of the current in microamperes when a D.C. voltage is applied to the test specimen, and the horizontal axis shows the value of the D.C. voltage in volts applied to the specimen. The light from an incandescent lamp is used to illuminate the test specimen and has an illumination brightness of 10 luxes. From FIG. 3 it will be seen that the photoconductive material according to the present invention represented by the curves II is superior in its operating characteristics over the conventional photoconductive material represented by the curves I in that it has a high dark resistance and a high dielectric breakdown voltage in a region of relatively high voltage which is generally employed in practical application. An especially remarkable improvement is effected in the value of $\beta$ in the dark voltage-current characteristic in that the value of $\beta$ in the photoconductive material according to the invention is reduced to as low as about 1.5 whereas the value of $\beta$ in the conventional photoconductive material is as high as about 2.5.

The notable facts described with reference to FIGS. 2 and 3 are of great importance when the photoconductive material is intended for use as an infrared ray detector, and especially the capability of detection of an input lower than the prior minimum detectable input and the increase in the dark resistance owing to the effect of zinc addition to the photoconductive material according to the present invention are of very great practical advantage for the photoconductive powder of solid-state image converter, as mentioned.

We claim:

1. A method for manufacturing a photoconductive powder, comprising the steps of:

(a) sintering a powdery host material consisting essentially of $CdS_{1-x}Se_x$ into a sintered composition for approximately 40 minutes at a temperature in the range of approximately 500 to 700° C., where $O<x\leqq 1$, in the presence of an activator selected from the group consisting essentially of copper and silver to add said activator to the host material in an amount substantially from $2\times10^{-4}$ to $10^{-3}$ molecules per molecule of the host material.

(b) pulverizing the sintered composition into powder, (c) wetting said pulverized powder with a mixture of approximately a 0.2 mol water solution of at least one of chlorine, bromine and iodine as coactivator and of approximately a 0.5 mol water solution of zinc salt, (d) drying the composition of step (c) to evaporate the water of said mixture, (e) sintering the pulverized powder for approximately 40 minutes at a temperature in the range of approximately 500° to 700° C., (f) further sintering the powdery composition for approximately 15 minutes in an atmosphere of sulfur gas and an inert gas at a temperature of approximately 480° C., and (g) then heating the further sintered composition for approximately 10 minutes in a vacuum atmosphere, thereby enhancing the dark resistance of the resulting powder composition.

2. The method according to claim 1, in which said water-soluble salt of zinc is selected from the group consisting of a halide, sulfate and nitrate of zinc.

3. The method according to claim 1, in which at least one element selected from the group consisting of bromine and iodine is added in the form of cadmium bromide and cadmium iodide, respectively, as said coactivator.

4. The method according to claim 3, in which at least one of the ammonium salts of bromine and iodine is added in combination with one of said cadmium bromide and cadmium iodine.

5. The method according to claim 1, in which substantially simultaneously with the addition of at least one element selected from the group consisting of bromine and iodine, chlorine is additionally added in the form of at least one member seelcted from the group consisting of cadmium chloride and ammonium chloride.

6. A photoconductive powder having improved sensitivity to low intensity optical input produced by the method of claim 1.

References Cited

UNITED STATES PATENTS

| | | | |
|---|---|---|---|
| 2,765,385 | 10/1956 | Thomsen | 252—501 X |
| 2,866,878 | 12/1958 | Briggs et al. | 252—501 X |
| 2,876,202 | 3/1959 | Busanovich et al. | 252—501 |
| 2,879,182 | 3/1959 | Parksuer et al. | 252—501 X |
| 2,908,594 | 10/1959 | Briggs | 252—501 X |
| 2,916,678 | 12/1959 | Bube et al. | 252—501 X |
| 2,980,500 | 4/1961 | Miller | 252—501 X |
| 3,175,091 | 3/1965 | Cheroff et al. | 252—501 X |
| 3,238,150 | 3/1966 | Behringer et al. | 252—501 |
| 3,324,294 | 6/1967 | Schuil | 252—501 X |
| 3,401,107 | 9/1968 | Redington | 252—501 X |

CHARLES E. VAN HORN, Primary Examiner

U.S. Cl. X.R.

338—18